(12) United States Patent
Ivanter et al.

(10) Patent No.: US 10,415,146 B2
(45) Date of Patent: Sep. 17, 2019

(54) ELECTRODE WITH TWO LAYER COATING, METHOD OF USE, AND PREPARATION THEREOF

(71) Applicant: Evoqua Water Technologies LLC, Warrendale, NJ (US)

(72) Inventors: Irina A. Ivanter, Sayreville, NJ (US); Julio W. Chang-Ng, Metuchen, NJ (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

(21) Appl. No.: 15/521,109

(22) PCT Filed: Oct. 20, 2015

(86) PCT No.: PCT/US2015/056408
§ 371 (c)(1),
(2) Date: Apr. 21, 2017

(87) PCT Pub. No.: WO2016/064836
PCT Pub. Date: Apr. 28, 2016

(65) Prior Publication Data
US 2017/0356095 A1    Dec. 14, 2017

Related U.S. Application Data

(60) Provisional application No. 62/066,431, filed on Oct. 21, 2014.

(51) Int. Cl.
*C25B 11/04* (2006.01)
*H01M 4/86* (2006.01)
(Continued)

(52) U.S. Cl.
CPC ............ *C25B 11/0484* (2013.01); *C25B 9/06* (2013.01); *H01M 4/8657* (2013.01);
(Continued)

(58) Field of Classification Search
CPC .... C25B 9/06; C25B 11/0484; H01M 4/8657; H01M 4/8817; H01M 4/886; H01M 4/8885; H01M 4/9016
See application file for complete search history.

(56) References Cited

U.S. PATENT DOCUMENTS

| 4,513,102 A | 4/1985 | Hutchings et al. |
| 4,765,879 A * | 8/1988 | Matsumoto ......... C25B 11/0484 204/290.04 |

(Continued)

FOREIGN PATENT DOCUMENTS

| CN | 102174704 A | 9/2011 | |
| KR | 1020100085476 A * | 7/2010 | ............. C25B 11/08 |

(Continued)

*Primary Examiner* — Ciel P Thomas

(57) ABSTRACT

Systems and methods for manufacturing and use of a two layer coated electrode are provided. The two layer coated electrode may comprise a substrate, a first coating layer, and a second coating layer. The first coating layer may comprise a mixture of iridium oxide and tin oxide, and the second coating layer may comprise a mixture of iridium oxide and tantalum oxide. The electrode may be used in, for example, an electrolytic cell.

24 Claims, 4 Drawing Sheets

(51) Int. Cl.
  *H01M 4/88* (2006.01)
  *H01M 4/90* (2006.01)
  *C25B 9/06* (2006.01)

(52) U.S. Cl.
  CPC ......... *H01M 4/886* (2013.01); *H01M 4/8817* (2013.01); *H01M 4/8885* (2013.01); *H01M 4/9016* (2013.01)

(56) References Cited

U.S. PATENT DOCUMENTS

| | | |
|---|---|---|
| 2008/0035491 A1 | 2/2008 | Ohta et al. |
| 2012/0085571 A1 | 4/2012 | Niksa et al. |
| 2013/0186750 A1 | 7/2013 | Urgeghe et al. |
| 2014/0311915 A1* | 10/2014 | Timpano ............. C25B 11/0484 205/261 |

FOREIGN PATENT DOCUMENTS

| | | |
|---|---|---|
| WO | 2012175673 A1 | 12/2012 |
| WO | 2014083144 A1 | 6/2014 |

* cited by examiner

ELECTRODE WITH TWO LAYER COATING, METHOD OF USE, AND PREPARATION THEREOF

CROSS-REFERENCE TO RELATED APPLICATIONS

This application is a U.S. national phase application and claims the benefit of priority under 35 U.S.C. § 371 of International (PCT) patent application Serial No. PCT/US2015/056408, titled "ELECTRODE WITH TWO LAYER COATING, METHOD OF USE, AND PREPARATION THEREOF" and filed on Oct. 20, 2015, which in turn claims priority under 35 U.S.C. § 119(e) to U.S. Provisional Patent Application Ser. No. 62/066,431, filed on Oct. 21, 2014, titled "Two Layer Electrode with Improved Durability" the entire disclosure of which is hereby incorporated by reference in its entirety for all purposes.

FIELD OF THE DISCLOSURE

Aspects relate generally to electrode coatings and, more particularly, to two layered electrode coatings, their method of preparation, and use.

SUMMARY

In some embodiments, an electrode is provided. The electrode comprises an electrically conductive substrate, a first coating covering at least a portion of a surface of the electrically conductive substrate, comprising a mixture of iridium oxide and tin oxide, and a second coating covering at least a portion of the first coating, comprising a mixture of iridium oxide and tantalum oxide.

In some aspects, the electrically conductive substrate comprises a valve metal. In some aspects, the valve metal is selected from the group consisting of titanium, zirconium, niobium, and tantalum. In some aspects, the valve metal is titanium.

In some aspects, the first coating comprises about 30 wt. % to about 85 wt. % iridium oxide. In some aspects, the first coating comprises about 45 wt. % to about 65 wt. % iridium oxide. In some aspects, the second coating comprises about 40 wt. % to about 75 wt. % iridium oxide.

In some aspects, the second coating comprises about 40 wt. % to about 75 wt. % iridium oxide. In some aspects, the second coating comprises about 65 wt. % iridium oxide.

In some aspects, the molar ratio of iridium oxide in the first coating to the iridium oxide in the second coating is selected from the group consisting of 1:2, 1:1, and 2:1. In some aspects, the molar ratio of iridium oxide in the first coating to the iridium oxide in the second coating is 1:1. In some aspects, the electrode provides for about a 175% longer normalized life than an electrode comprising a single layer coating consisting of a composition of the second coating. In some aspects, the electrode provides for about a 110% longer normalized life than an electrode comprising a single layer coating consisting of a composition of the first coating.

In some aspects, the electrode is an anode.

In some embodiments, a method of preparing an electrode is provided. The method comprises apply a first coating layer comprising iridium oxide and tin oxide to at least a portion of a surface of an electrically conductive substrate, and applying a second coating layer comprising iridium oxide and tantalum oxide to at least a portion of the first coating layer.

In some aspects, the method further comprises, prior to applying the first coating layer, preparing the electrically conductive substrate to remove contaminants and to develop the surface.

In some aspects, the method further comprises, after applying the first coating layer, drying the first coating layer.

In some aspects, the method further comprises, after applying the second coating layer, drying the second coating layer.

In some aspects, the molar ratio of iridium oxide in the first coating to iridium oxide in the second coating is about 1:2 to 2:1.

In some embodiments, a method of manufacturing an electrochemical device is provided. The method comprises preparing an electrode comprising an electrically conductive substrate, a first coating covering at least a portion of a surface of the electrically conductive substrate, comprising a mixture of iridium oxide and tin oxide, and a second coating covering at least a portion of the first coating, comprising a mixture of iridium oxide and tantalum oxide, and installing the electrode in an electrolytic cell.

In some embodiments, a system comprising an electrolytic cell is provided. The system comprises an electrically conductive substrate, a first coating covering at least a portion of a surface of the electrically conductive substrate, comprising a mixture of iridium oxide and tin oxide, and a second coating covering at least a portion of the first coating, comprising a mixture of iridium oxide and tantalum oxide, and a power source for supplying a current to the electrode.

In some aspects, the electrode is immersed in an electrolyte.

BRIEF DESCRIPTION OF THE DRAWINGS

Various aspects of the at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. Where technical features in the figures, detailed description, or any claim are followed by reference signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Figure 1A:
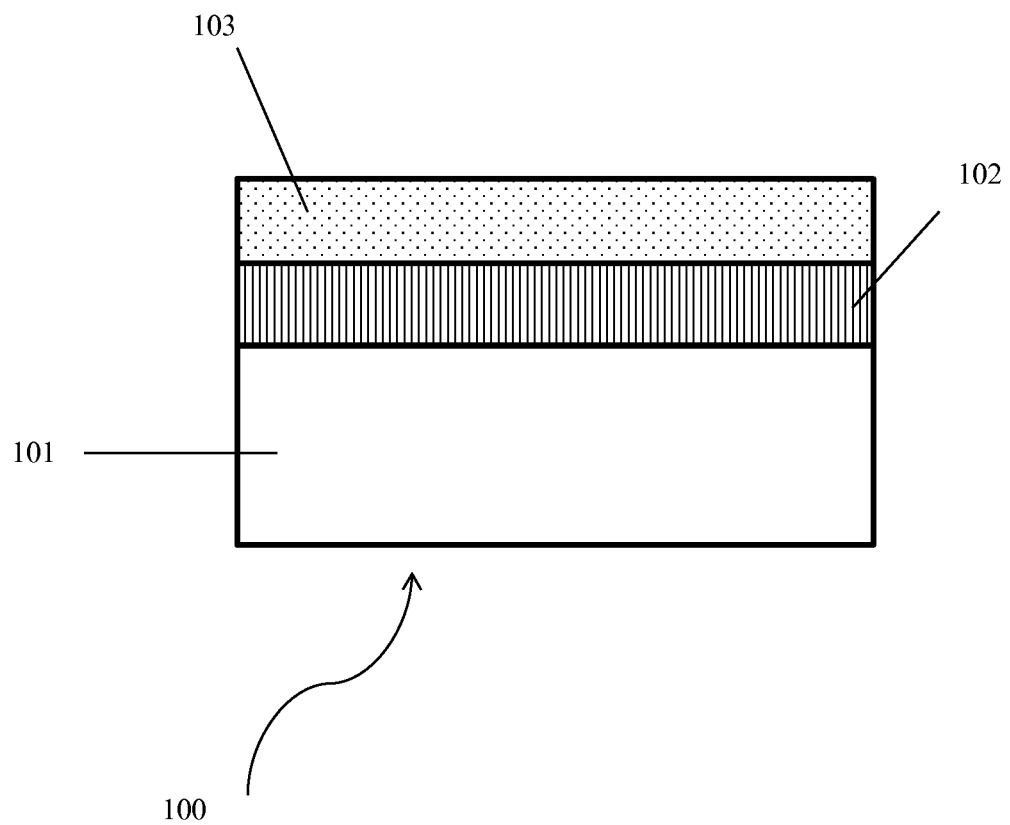
FIG. 1A is a side view of an electrode according to one embodiment of the disclosure.

An electrode is a solid electric conductor through which an electric current enters or leaves an electrolytic cell or other medium. Electrodes may be used in any electrochemical process that requires an electrical conductor. For example, electrodes may be used in electro-galvanizing, electroplating, electro-tinning, electroforming, electrowinning (e.g., electrowinning of metals such as copper, nickel, and zinc), and other electrochemical processes. Electrodes may be used in any halogen-evolving processes, such as hypochlorite, chlorate, and chlor alkali production, or in chlor organic synthesis. Electrodes may also be used in electrolytic chlorination systems and processes. Electrolytic chlorination systems and processes may produce sodium hypochlorite through the electrolysis of a brine solution. For example, the OSEC® Series on-site electrolytic chlorination systems available from Evoqua Water Technologies (Warrendale, Pa.) produce sodium hypochlorite on-demand and on-site through the electrolysis of a brine solution.

Electrodes may be used in electrolytic cells. An electrolytic cell is an electrochemical cell that may be used to overcome a positive free energy, which indicates a non-spontaneous reaction, and force a chemical reaction in a desired direction. The electrolytic cell converts electrical energy into chemical energy or produces chemical products through a chemical reaction.

The electrode in an electrolytic cell may be referred to as either an anode or a cathode, depending on the direction of electrical current through the cell. The anode is an electrode at which electrons leave the cell and oxidation of ions within the cell occurs, and the cathode is an electrode at which electrons enter the cell and reduction of ions within the cell occurs. Under these conditions, the direction of current through the cell is from the anode to the cathode. Each electrode may become either the anode or the cathode depending on the process and the direction of current through the cell.

The design of electrolytic cells and their electrodes may depend on one or more factors. The one or more factors may include, for example, construction and operating costs, desired product, electrical, chemical, and transport properties, electrode materials, shapes and surface properties, pH of the system (for example, electrolyte pH), and temperature of the system (for example, electrolyte temperature), competing undesirable reactions, and undesirable byproducts.

Depending on the electrochemical process, one or more properties of the process, for example, one or more of current density in the electrolytic cell, pH of the system (for example, electrolyte pH), or temperature of the system (for example, electrolyte temperature) may affect the effectiveness of the system and process, for example, the service life of the electrodes. For example, exposure to one or more of a high current density, low pH, or high temperature may lower the service life of an electrode. In some embodiments, exposure to one or more of a high current density, low pH, or high temperature may cause passivation of the electrode.

Passivation is the inhibition of a dissolution reaction caused by the formation of non-dissolving films. A dissolution reaction is a process by which the original state of a solvent becomes a solute. Anode and/or cathode passivation may result in one or more of lost production capacity, increased power costs, and decreased anode and/or cathode quality. When titanium is used as a substrate, anode passivation is the growth of an insulating titanium dioxide layer in the coating and the substrate, which increases the electrical potential in the anode, and causes deactivation of the anode. In some embodiments, exposure to one or more of a high current density, low pH, or high temperature may cause wear of the electrode. Wear of the electrode, or "electrode wear" is the removal of material from the electrode. In some embodiments, exposure to one or more of a high current density, low pH, or high temperature may cause both passivation and wear of the electrode.

As noted above, the electrolytic cell may comprise an electrolyte. An electrolyte is a substance that produces an electrically conducting solution when dissolved in a polar solvent, such as water. The solution is electrically neutral. The dissolved electrolyte separates into cations and anions that are dispersed uniformly through the solute. When an electric potential, or voltage, is applied to the electrolyte solution, the cations are drawn to the electrode that has an abundance of electrons, and the anions are drawn to the electrode that has a deficit of electrons. The movement of anions and cations in opposite directions within the solution amounts to a current. An electrolyte may be referred to as strong or weak, depending on the dissociation of the solute. If a high proportion, for example, greater than 50%, of the solute dissociates to form free ions, the electrolyte is strong. If a high proportion, for example, less than 50%, of the solute does not dissociate, the electrolyte is weak. In some embodiments, the electrolyte may be NaCl acidified by HCl. In other embodiments, the electrolyte may be platinum salt.

In some embodiments, electrodes may be exposed to electrolytes having a low pH. Electrolytes having a low pH may refer to electrolytes having an acidic pH, for example, less than a pH of 7. For example, the electrolytes may be strong acid electrolytes. In some aspects, the strong acid electrolyte may be sulfuric acid.

In some embodiments, low pH may refer to electrolytes having a pH lower than about 3. In some embodiments, low pH may refer to electrolytes having a pH lower than about 2. In some embodiments, low pH may refer to electrolytes having a pH lower than about 1. In some embodiments, low pH may refer to a pH lower than about 0.8. In some embodiments, low pH may refer to a pH lower than about 0.6. In some embodiments, low pH may refer to a pH lower than about 0.4. In some embodiments, low pH may refer to a pH lower than about 0.2.

In some embodiments, electrodes may be exposed to electrolytes having a high temperature. A high temperature may be a temperature at which the cell voltage of the electrode undesirably decreases. A high temperature may be a temperature higher than about 50° C. In some embodiments, a high temperature is higher than about 55° C. In some embodiments, a high temperature is higher than about 60° C. In some embodiments, a high temperature is higher than about 65° C. In some embodiments, a high temperature is higher than about 70° C.

In some embodiments, electrodes may be exposed to high current densities. A current density is a measure of the density of an electric current. It is defined as a vector whose magnitude is the electric current per cross-sectional area, and may be measured in, for example, amperes per square meter ($A/m^2$). High current densities may have undesirable consequences. For example, high current densities may have undesirable consequences to one or more of a coating, electrode, electrolytic cell, and electrochemical device. Electrodes have a finite, positive resistance, causing them to dissipate power in the form of heat. The current density must be kept sufficiently low to protect the electrode from passivation or wear.

In some embodiments, a high current density is a current density that causes at least one of passivation and wear of the electrodes. In some embodiments, a high current density may be higher than about 0.5 $kA/m^2$. For example, a high current density may be higher than about 1.0 $kA/m^2$. A high current density may be higher than about 1.5 $kA/m^2$. In some embodiments, a high current density may be higher than about 2.0 $kA/m^2$. For example, a high current density may be higher than about 2.5 $kA/m^2$. In some embodiments, a high current density may be higher than about 3.0 $kA/m^2$. For example, a high current density may be higher than about 3.5 kA/m². In some embodiments, a high current density may be higher than about 4.0 kA/m². For example, a high current density may be higher than about 4.5 kA/m². In some embodiments, a high current density may be about 5.0 kA/m². In some embodiments, a high current density may be up to about 15 kA/m².

An electrode may be coated with two layers of coatings, the combination of which limit passivation and wear in particular electrochemical applications. A coating layer may refer to one application or more than one application of a coating. Through use of an electrode having two coatings, a synergistic effect may result. The synergistic effect may provide optimal (e.g., increased) performance of an electrode, as compared to the sum of the performance of an electrode having a first coating and the performance of an electrode having a second coating. For example, the application may have one or more of the following characteristics: a low pH, high electrolyte temperature, and high current density. The first coating layer may comprise a mixture of iridium oxide and tin oxide, and the second layer may comprise mixture of iridium oxide and tantalum oxide. The first and second coating layers, in combination, exhibit high catalytic activity, stability, longer life, better performance, less down time in operation due to less frequent replacement of the electrodes, and cost effectiveness. In some embodiments, at least one of the solutions for first coating layer and the second coating layer application may further comprise a solvent. In some embodiments, the solution for the first coating layer may further comprise an alcohol. For example, the solution for the first coating layer may further comprise 2-Propanol. In some embodiments, the solution for the second coating layer may further comprise an acid. For example, the solution for the second coating layer may further comprise hydrochloric acid.

The first coating layer may be applied directly to the electrode substrate, and the second coating layer may be applied directly to the first coating layer. The first coating layer and the second coating layer may reduce at least one of passivation and wear of the electrode. In some embodiments, the first coating layer may reduce passivation of the electrode. In some embodiments, the second coating layer may reduce wear of the electrode.

As used herein, a "single coating layer electrode" refers to an electrode that is coated on at least one of its surfaces with a single coating comprising a mixture. The single coating may be a mixture that reduces at least one of passivation and wear of the electrode. In some embodiments, the single coating may be a mixture comprising iridium oxide and tin oxide. In some embodiments, the single coating may be a mixture consisting essentially of iridium oxide and tin tantalum oxide. In some embodiments, the single coating may be a mixture consisting of iridium oxide and tin oxide. In some embodiments, the single coating may be a mixture comprising iridium oxide and tantalum oxide. In some embodiments, the single coating may be a mixture consisting essentially of iridium oxide and tantalum oxide. In some embodiments, the single coating may be a mixture consisting of iridium oxide and tantalum oxide. The mixtures provided as coatings may be in a solid solution, for example, a solid-state solution. In this solid solution, the mixture may be in a single homogeneous phase.

As used herein, a "two coating layer electrode" refers to an electrode that is coated on at least one of its surfaces with a first coating comprising a mixture to provide a first coating layer, and a second coating that at least partially coats the first coating to provide a second coating layer. More than one application of the first coating may be performed to achieve the desired coating loading. More than one application of the second coating may be performed to achieve the desired coating loading. At least one of the two coatings may be a mixture that reduces at least one of passivation and wear of the electrode. In some embodiments, the first coating may reduce passivation of the electrode. In some embodiments, the second coating may reduce wear of the electrode. In some embodiments, the electrode substrate surface may be at least partially covered with a first coating comprising a mixture. The first coating may be a mixture comprising iridium oxide and tin oxide. In some embodiments, the first coating may be a mixture consisting essentially of iridium oxide and tin oxide. In some embodiments, the first coating may be a mixture consisting of iridium oxide and tin oxide. The first coating may be at least partially covered by a second coating comprising a mixture. In some embodiments, the second coating may be a mixture comprising iridium oxide and tantalum oxide. In some embodiments, the second coating may be a mixture consisting essentially of iridium oxide and tantalum oxide. In some embodiments, the second coating may be a mixture consisting of iridium oxide and tantalum oxide.

In some embodiments, the two coating layer electrode may comprise an electrically conductive substrate, a first coating covering at least a portion of a surface of the electrically conductive substrate, comprising a mixture of iridium oxide and tin oxide, and a second coating covering at least a portion of the first coating, comprising a mixture of iridium oxide and tantalum oxide. In some embodiments, the two coating layer electrode may consist essentially of an electrically conductive substrate, a first coating covering at least a portion of a surface of the electrically conductive substrate, comprising a mixture of iridium oxide and tin oxide, and a second coating covering at least a portion of the first coating, comprising a mixture of iridium oxide and tantalum oxide. In some embodiments, the two coating layer electrode may consist of an electrically conductive substrate, a first coating covering at least a portion of a surface of the electrically conductive substrate, comprising a mixture of iridium oxide and tin oxide, and a second coating covering at least a portion of the first coating, comprising a mixture of iridium oxide and tantalum oxide.

The electrode substrate may be any substrate having electrically conductive properties. The electrode substrate may be any substrate having sufficient mechanical strength to serve as a support for the coating. The electrode substrate may be any substrate having a resistance to corrosion when exposed to the interior environment of an electrolytic cell. The electrode substrate may be a metal. In some embodiments, the electrode substrate may be a valve metal or an alloy thereof. Valve metals are any of the transition metals of Group IV and V of the periodic table, including titanium, vanadium, zirconium, niobium, hafnium, and tantalum. In some embodiments, suitable valve metals include titanium, zirconium, niobium, and tantalum. In some embodiments, the electrode substrate preferably comprises titanium. Titanium may be preferred because of its availability, chemical properties, and low cost.

The first coating layer may comprise a mixture of iridium oxide ($IrO_2$) and tin oxide ($SnO_2$). In some embodiments, the first coating layer may consist essentially of a mixture of $IrO_2$ and ($SnO_2$). In some embodiments, the first coating layer may consist of a mixture of $IrO_2$ and $SnO_2$. Iridium oxide in the coating may be in any weight concentration such that a desired property is achieved, for example, reduction of passivation or wear of the electrode, or increased lifetime of the coating layer. The weight concentration of iridium oxide is the weight of iridium oxide compared to the weight of the first coating layer after being dried (for example, after the solvents have evaporated). In some embodiments, the weight concentration of iridium oxide is within a range of 30 wt. % to 85 wt. %. In some aspects, the weight concentration of iridium oxide is within a range of 45 wt. % to 65 wt. %.

The second coating layer may comprise a mixture of iridium oxide and tantalum oxide ($Ta_2O_5$). In some embodiments, the second coating layer may consist essentially of a mixture of $IrO_2$ and $Ta_2O_5$. In some embodiments, the second coating layer may consist of iridium oxide $IrO_2$ and $Ta_2O_5$. Iridium oxide may be in any weight concentration such that a desired property is achieved, for example, reduction of passivation or wear of the electrode. The weight concentration of iridium oxide is the weight of iridium oxide compared to the weight of the second coating layer after being dried. In some embodiments, the weight concentration of iridium oxide is within a range of 40 wt. % to 75 wt. %. In some aspects, the weight concentration of iridium oxide is about 65 wt. %.

The electrode substrate may be applied with, for example, coated with the first and second coating layers according to any application process that may provide for a homogeneous or substantially homogeneous dispersal of material to the desired surface. For example, the first and second coating layers may be applied to the electrode substrate by brushing, rolling, dipping, spraying, or by atomic or molecular layer deposition, or the like. The electrode substrate may be coated with the first and second coating mixtures according to a thermal decomposition method.

The electrode substrate may first be prepared for application of a coating. For example, the electrode substrate may be treated or cleaned to accept the coating layer, or to provide for a surface that may be susceptible to adherence of a coating layer. Cleaning of the electrode substrate may be performed by chemical degreasing, electrolytic degreasing, or treatment with an oxidizing acid. The electrode substrate may be prepared by any method suitable to remove or minimize contaminants and develop high surface roughness that may hinder proper adhesion of the coating to the surface of the substrate and lower the effective current density for coated metal surfaces, thus also decreasing the electrode operating potential. Longer lived anodes translate into less down time and cell maintenance, thereby cutting operating cost. For example, the electrode substrate may be prepared by a cleaning, sandblasting, etching, and/or pre-oxidation process. Other methods of preparing the electrode substrate may include plasma spraying, melt spraying with ceramic oxide particles, melt spraying of a valve metal layer onto the electrode substrate, grit blasting with a sharp grit, and annealing. Cleaning of the electrode substrate may be followed by mechanical roughening to prepare the surface for coating. In some embodiments, when the cleaning is performed via sandblasting, it may be followed by an etching process. In some embodiments, the mechanical roughening process may be flame spray application of a fine-particle mixture of metal powders.

In some embodiments, a porous oxide layer may be applied to the electrode substrate to anchor the coating layer to the substrate. For example, the electrode substrate may be flame or plasma sprayed onto an electrode substrate before application of an electrochemically active substance. In some embodiments, the thermally sprayed material may consist of a metal oxide or a metal nitride to which electrocatalytically active particles have been pre-applied.

The first and second coating layers may be applied by way of a thermal decomposition method in a molar ratio suitable to provide a desired property or effect to the resulting electrode. For example, the desired effect or property may be extended service life by way of one or both of the reduction of wear and the avoidance of passivation. In some embodiments, the molar ratio of the iridium oxides in the first layer to iridium oxides in the second layer may be between about 1:5 and about 5:1. In some embodiments, the molar ratio of the iridium oxides in the first layer to iridium oxides in the second layer may be between about 1:2 and about 2:1. For example, the molar ratio of the iridium oxides in the first layer to iridium oxides in the second layer may be about 1:1.

The first coating layer may be dried after application of the first coating layer and before application of the second coating layer. The first coating layer can be air dried and subsequently dried in a first furnace at an elevated temperature and time sufficient to dry the first coating layer. The furnace may contain a source of oxygen. For example, the source of oxygen may be air. The first coating layer may be dried in the first furnace at a first temperature and for a first duration, and subsequently dried in a first or second furnace at a second temperature and for a second duration. One or both of the first temperature and the second temperature may be an elevated temperature. The elevated temperature may be a temperature greater than ambient temperature. Ambient temperature may be the temperature in a room, or the temperature which surrounds an object under discussion. Normal ambient temperatures may be in a range from about 20° C. to about 25° C.; thus, in certain embodiments, an elevated temperature is at least greater than 20° C. In some embodiments, the first coating layer may be dried in a first furnace from between about 80° C. and about 120° C. For example, the first coating layer may be dried in a first furnace at about 90° C. In some embodiments, the first coating layer may be dried in a first furnace for about 5 minutes to about 3 hours. For example, the first coating layer may be dried in a first furnace for about 5 minutes to 60 minutes. In some embodiments, the first coating layer may be dried in a first furnace for about 10 minutes.

The first coating layer may then be dried in a second furnace. The second furnace may contain a source of oxygen. For example, the source of oxygen may be air. In some embodiments, the first coating layer may be dried in a second furnace from between about 250° C. and about 750° C. For example, the first coating layer may be dried in a second furnace at about 500° C. In some embodiments, the first coating layer may be dried in a first furnace for about 5 minutes to about 3 hours. For example, the first coating layer may be dried in a second furnace for about 1 hour. More than one application of the first coating layer may be applied to achieve a desired coating loading.

The second coating layer may be dried in the first furnace at a first temperature and for a first duration, and subsequently dried in a first or second furnace at a second temperature and for a second duration. One or both of the first temperature and the second temperature may be an elevated temperature. In some embodiments, the second coating layer may be dried in a first furnace from between about 80° C. and about 120° C. For example, the second coating layer may be dried in a first furnace at about 90° C. In some embodiments, the second coating layer may be dried in a first furnace for about 5 minutes to about 3 hours. For example, the second coating layer may be dried in a first furnace for about 5 minutes to about 60 minutes. In some embodiments, the second coating layer may be dried in a first furnace for about 10 minutes.

The second coating layer may then be dried in a second furnace. The second furnace may contain a source of oxygen. For example, the source of oxygen may be air. In some embodiments, the second coating layer may be dried in a second furnace from between about 250° C. and about 750° C. For example, the second coating layer may be dried in a second furnace at about 500° C. In some embodiments, the second coating layer may be dried in a first furnace for about 5 minutes to about 3 hours. For example, the second coating layer may be dried in a second furnace for about 1 hour. More than one application of the second coating layer may be applied to achieve a desired coating loading.

In some embodiments, the coating layers may have a thickness of from about 0.2 $g/m^2$ to about 3.5 $g/m^2$. The thickness of the coating layers may be independent of the dimensions of the electrode.

The electrode may be installed in an electrolytic cell. In an embodiment, the electrolytic cell also has a power source for supplying a current to the electrodes of the electrolytic cell. In some embodiments, the source of current may be a direct current source. In the current direction, one electrode typically acts as the anode and its counterpart typically acts as the cathode.

The electrolytic cell may be part of a system. For example, the electrolytic cell may be used in a wastewater treatment system. In some embodiments, the electrolytic cell may be used in a municipal or industrial wastewater treatment system. In some embodiments, the electrolytic cell may be used in a chemical processing system. In some embodiments, the electrolytic cell may be used in an industrial process water system. For example, the electrolytic cell may be used in an electrolytic chlorine generation system. The system may comprise a source of salt water. For example, the system may comprise a source of ballast water. In some embodiments, the system may further comprise a water outlet. For example, the system may comprise a potable water outlet. In some embodiments, the system may further comprise a water storage unit fluidly connected to the water outlet. In some embodiments, the system may further comprise a contaminant outlet. For example, the system may comprise a chlorine solution outlet. In some embodiments, the system may chlorine solution outlet may comprise a sodium hypochlorite solution outlet. In some embodiments, the system may comprise a contaminant storage unit fluidly connected to the contaminant outlet.

Figure 1B:
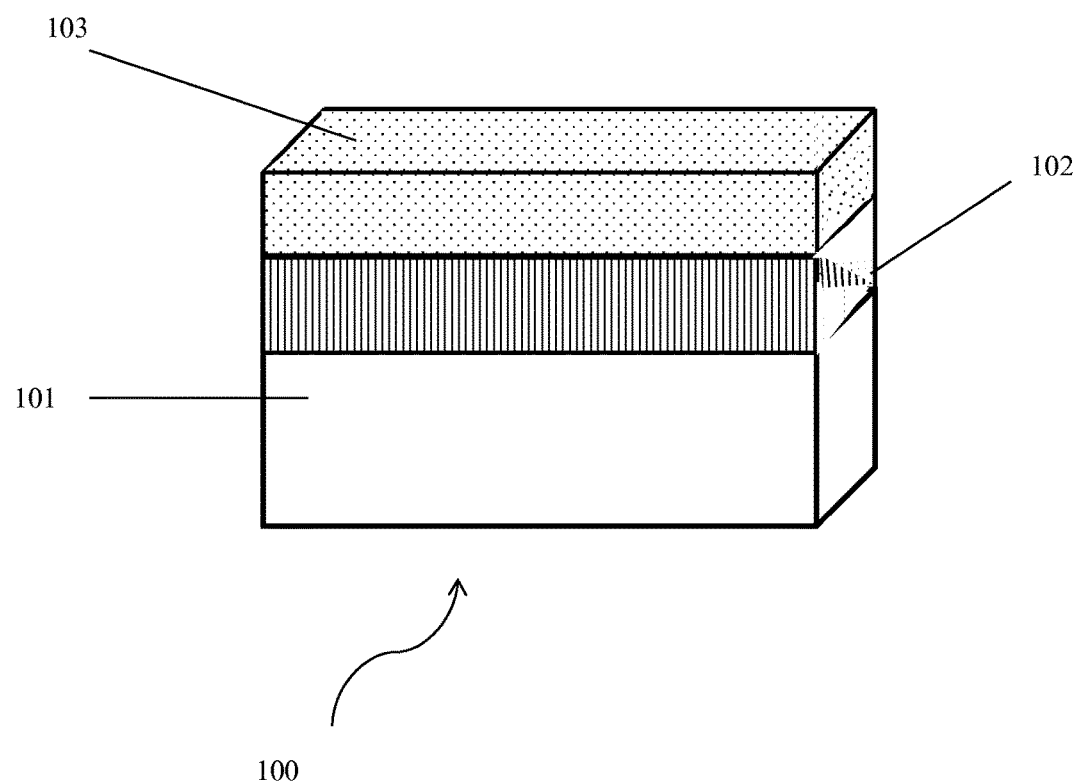
FIG. 1B is a perspective view of an electrode according to one embodiment of the disclosure.

Referring to FIGS. 1A and 1B, a two coating layer electrode is provided. Electrode 100 comprises substrate 101. Substrate 101 may be any substrate having electrically conductive properties. Substrate 101 may be a metal. In some embodiments, substrate 101 may be a valve metal. For example, substrate 101 may comprise titanium, vanadium, zirconium, niobium, hafnium, or tantalum. In some embodiments, substrate 101 preferably comprises titanium. Substrate 101 may be prepared for application of a coating layer. For example, substrate 101 may be treated or cleaned to accept the coating layer, or to provide for a surface that may be susceptible to adherence of a coating layer. Cleaning of substrate 101 may be performed by chemical degreasing, electrolytic degreasing, or treatment with an oxidizing acid. Substrate 101 may be prepared by any method suitable to remove or minimize contaminants and develop high surface roughness that may hinder proper adhesion of the coating to the surface of substrate 101 and lower the effective current density for coated metal surfaces, thus also decreasing the electrode operating potential. For example, substrate 101 may be prepared by a cleaning, sandblasting, etching, and/or pre-oxidation process. Other methods of preparing substrate 101 may include plasma spraying, melt spraying with ceramic oxide particles, melt spraying of a valve metal layer onto the electrode substrate, grit blasting with a sharp grit, and annealing. Cleaning of substrate 101 may be followed by mechanical roughening to prepare the surface for coating. In some embodiments, when the cleaning is performed via sandblasting, it may be followed by an etching process. In some embodiments, the mechanical roughening process may be flame spray application of a fine-particle mixture of metal powders.

Substrate 101 may be coated with a first coating layer 102. First coating layer 102 may cover at least a portion of the surface of substrate 101. First coating layer 102 may comprise a mixture of iridium oxide ($IrO_2$) and tin oxide ($SnO_2$). First coating layer 102 may comprise $IrO_2$ in any weight concentration such that a desired property is achieved, for example, at least one of reduction of passivation or wear of the electrode. In some embodiments, the weight concentration of $IrO_2$ in first coating layer 102 is within a range of 30 wt. % to 85 wt. %. In some aspects, the weight concentration of $IrO_2$ in first coating layer 102 is within a range of 45 wt. % to 65 wt. %. First coating layer 102 may be applied to the surface of substrate 101 by any known application process. For example, first coating layer 102 may be applied to the surface of substrate 101 by brushing, rolling, or spraying. First coating layer 102 may be applied to the surface of substrate 101 according to a thermal decomposition method.

First coating layer 102 may be coated with a second coating layer 103. Second coating layer 103 may cover at least a portion of first coating layer 102. Second coating layer 103 may comprise a mixture of iridium oxide ($IrO_2$) and tantalum oxide ($Ta_2O_5$). Second coating layer 103 may comprise $IrO_2$ in any weight concentration such that a desired property is achieved, for example, reduction of passivation or wear of the electrode. In some embodiments, the weight concentration of $IrO_2$ in second coating layer 103 is within a range of 40 wt. % to 75 wt. %. In some aspects, the weight concentration of $IrO_2$ in second coating layer 103 is about 65 wt. %. Second coating layer 103 may be applied to first coating layer 102 by brushing, rolling, or spraying. Second coating layer 103 may be applied to first coating layer 102 according to a thermal decomposition method. The first and second coating layers may be applied in a molar ratio of between about 1:5 and about 5:1. For example, the first and second coating layers may be applied in a molar ratio of between about 1:2 and about 2:1.

Figure 2:
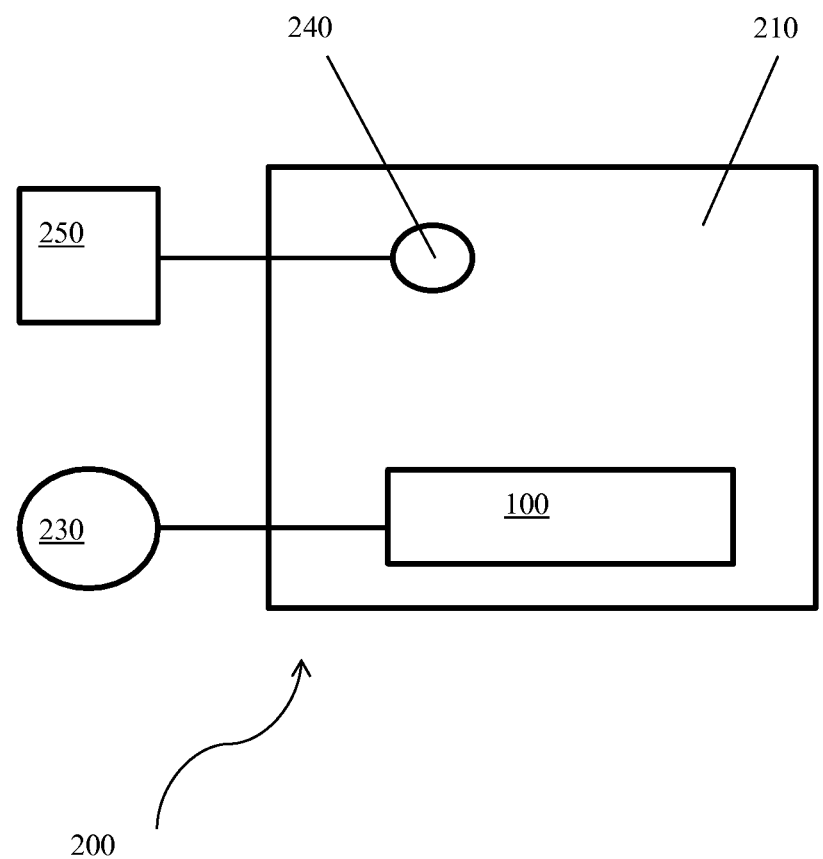
FIG. 2 is a schematic of an electrochemical device according to one embodiment of the disclosure.

Referring now to FIG. 2, an electrochemical system is provided. System 200 may comprise electrolytic cell 210. Electrolytic cell 210 may comprise at least one electrode 100 as described above. Electrode 100 may be at least one of an anode and a cathode. In some embodiments, electrode 100 is an anode. System 200 may further comprise power source 230 operably connected to electrolytic cell 210. Power source 230 may supply direct current to electrolytic cell 210.

One or more sensors 240 may be located within electrolytic cell 210. Sensor 240 may be configured to measure a quality of system 200. In some embodiments, sensor 240 may be configured to measure one or more of the pH of the system (for example, pH of an electrolyte), the temperature of the system (for example, temperature of the electrolyte), conductivity of the electrolyte, and the current of the system. The sensors 240 may communicate, electrically or otherwise, with controller 250 to provide the controller with a signal indicative of the measured property of the system. Controller 250 may control one or more properties of the system. For example, controller 250 may control the amperage into the system from power source 230.

The function and advantages of these and other embodiments will be more fully understood from the following non-limiting examples. The examples are intended to be illustrative in nature and are not to be considered as limiting the scope of the embodiments discussed herein.

EXAMPLES

Example 1

A first single coating layer electrode was prepared. The electrode was prepared by coating a surface of a substrate of commercial titanium grade 2 with a coating comprising $IrO_2$ and $SnO_2$. The titanium substrate was cleaned in a commercially available alkaline bath for 20 minutes at a temperature of 60° C., and then rinsed with deionized water. After air drying for about 5 minutes to about 60 minutes, the substrate was sand blasted with aluminum oxide, etched in 10% oxalic acid at 85° C. for about four hours, and preoxidized at 550° C. for two hours.

A mixture of salts of iridium and tin was prepared by dissolving 4.57 g of hexachloroiridic acid hydrate ($H_2IrCl_6 \times 4H_2O$), 3.58 g of stannic chloride ($SnCl_4 \times 5H_2O$) in 54.8 ml of water with addition of 8.7 ml of 2-Propanol. This mixture was applied to the cleaned substrate to achieve a loading of 1.5 g/m² per coat on a dry basis. The wet coated substrate was allowed to air dry for about 20 minutes before being placed in a furnace where it was heated for 10 minutes at a temperature of 90° C. and for 15 minutes at a temperature of 460° C. The mixture was reapplied, air dried, and heated as described above, several times to obtain a total coating loading of at least 5 g/m². An electrode having a first single coating layer comprising $IrO_2$ and $SnO_2$ was achieved.

Example 2

A second single coating layer electrode was prepared. The electrode was prepared by coating a surface of a substrate of commercial titanium grade 2 with a coating comprising $IrO_2$ and $Ta_2O_5$. The titanium substrate was cleaned in a commercially available alkaline bath for 20 minutes at a temperature of 60° C., and then rinsed with deionized water. After air drying for about 5 minutes to about 60 minutes, the substrate was sand blasted with aluminum oxide, etched in 10% oxalic acid at 85° C. for about four hours, and preoxidized at 550° C. for two hours.

A mixture of salts of iridium and tantalum was prepared by dissolving 6.47 g of Hexachloroiridic acid hydrate ($H_2IrCl_6 \times 4H_2O$), 2.86 g of tantalum chloride ($TaCl_5$) in 61.9 ml of butanol with addition of 3.5 ml of concentrated hydrochloric acid. This mixture was applied to the cleaned substrate to achieve a loading of 0.5-4.0 g/m² per coat on a dry basis. The wet coated substrate was allowed to air dry for about 15 minutes before being placed in a furnace where it was heated for 20 minutes at a temperature of 515° C. The mixture was reapplied, air dried, and heated as described above, several times to obtain a total coating loading of at least 5 g/m². An electrode having a second single coating layer comprising $IrO_2$ and $Ta_2O_5$ was achieved.

Example 3

The first and second single coating layer electrodes prepared according to Examples 1 and 2 were evaluated as anodes in an accelerated anode aging test at a current density of 20 kA/m² in an electrochemical cell containing 180 g/l of sodium sulfate with a pH of 1 at a temperature of 60° C. The electrolyte was circulated through the cell at 1.5 gph (5.67 lph). The cell voltage was recorded every hour.

Figure 3:
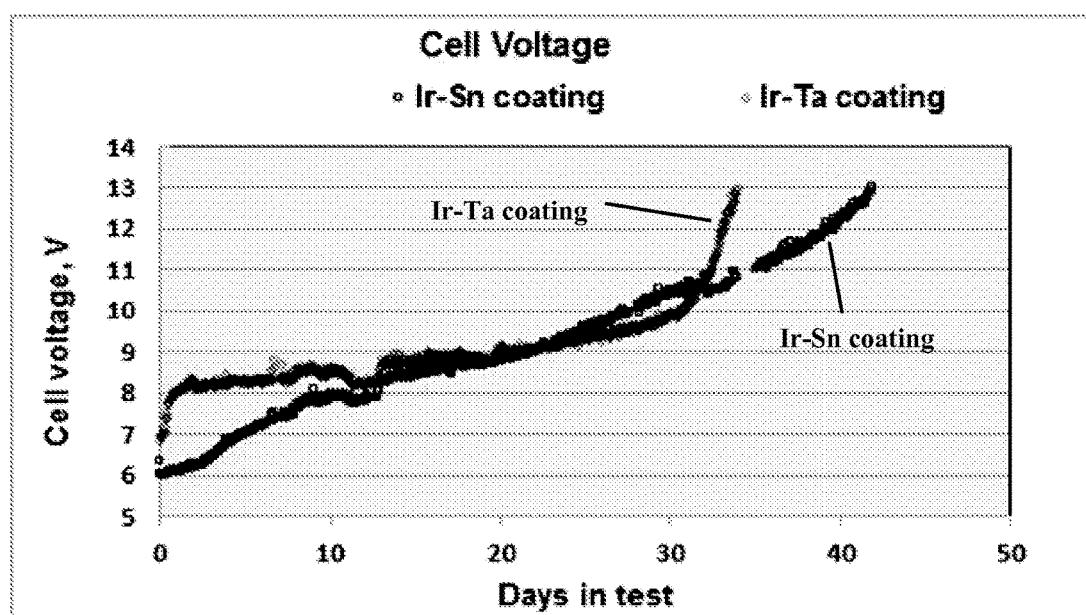
FIG. 3 is a plot of cell voltage versus days during a test period of the electrode coatings.

The first and second single coating layer electrodes exhibited different behavior in the accelerated aging test. The failure mechanisms of the iridium oxide-tin oxide coated electrodes and the iridium oxide-tantalum oxide coated anodes differed. At the end of life, the cell voltage rose sharply in the iridium oxide-tantalum oxide coated electrode, and the cell voltage gradually increased in the iridium oxide-tin oxide coated electrode, as shown in FIG. 3.

The coating loss was then measured at the anode end of life. The coating loss was measured as the difference between the original coating loading and the coating loading after anode failure in the accelerated aging test. The coating loading was measured with an X-Ray Fluorescence (XRF) Alloy analyzer. As can be seen in Table 1, the coating loss at the electrode failure was about 44% for the iridium oxide-tin oxide coating, and was about 16% for the iridium oxide-tantalum oxide coating. The amount of coating loss was about 3 times greater in the iridium oxide-tin oxide coating than in the iridium oxide-tantalum oxide coating.

A sharp voltage increase and low mechanical wear rate indicates that the failure mechanism of an iridium oxide-tantalum oxide coated anode is through passivation. A gradual increase in voltage and substantial coating loss (approximately 44%) on an iridium oxide-tin oxide coated anode indicates that the anode failed due to mechanical wear and passivation. Based on these results, it may be concluded that the iridium oxide-tin oxide coating is more resistant to passivation and can be used as a protective layer when applied on a substrate. The iridium oxide-tantalum oxide layer with lower mechanical wear rate will serve as a second layer protected from passivation by the iridium oxide-tin oxide layer.

TABLE 1

| Coating loss. | |
|---|---|
| Coating | Coating Loss (%) |
| Iridium oxide-tin oxide | 44 |
| Iridium oxide-tantalum oxide | 16 |

Example 4

Single coating layer electrodes having a titanium substrate were prepared and coated with either a layer of an iridium oxide-tin oxide coating, a layer of iridium oxide-tantalum oxide coating, or both. The weight concentration of iridium oxide in the iridium oxide-tin oxide coating was 58%, and the weight concentration of iridium oxide in the iridium oxide-tantalum oxide coating was 63%. The coatings were applied by a thermal decomposition process from a solution of the corresponding metal salt precursors, as described in Examples 1 and 2.

Two coating layer electrodes comprising both coating layers were prepared. The molar ratios of the iridium oxide in the first layer to the iridium oxide in the second layer were 1:2, 1:1, and 2:1. The electrodes all had coatings that contained 33 g/m² of Ir. The electrodes were subjected to an accelerated aging test at a current density of 20 kA/m² in an electrochemical cell containing 180 g/l of sodium sulfate with a pH of 1 at a temperature of 60° C. The electrolyte was circulated through the cell at 1.5 gph (5.67 lph).

The normalized lives of the single coating layer electrodes were tested. The iridium oxide-tantalum oxide single coating layer electrode had a normalized life (i.e., the lifetime in a virgin coating) of 343 kA*hr/g Ir, and the iridium oxide-tin oxide single coating layer electrode had a normalized life of 454 kA*hr/g Ir, as shown in Table 2. The lifetime of the electrode is determined by monitoring the electrical resistance of the cell. The current applied to the electrode may be constant, and a rise in voltage may indicate failure of the electrode. In some embodiments, the rise in voltage may be sudden, in that the voltage increases.

The normalized lives of the two coating layer electrodes were also tested. The two coating layer electrode in a molar ratio of iridium oxide in the first coating layer to iridium oxide in the second coating layer of 1:2 had a normalized life of 610 kA*hr/g Ir, which is a 77% increase over a single coating of iridium oxide-tantalum oxide and a 34% increase over a single coating of iridium oxide-tin oxide.

Increases were calculated by the following equation: $((x-y)/y)*100$, where x is the two coating layer electrode normalized life, and y is the single layer electrode normalized life. The two coating layer electrode in an molar ratio of iridium oxide in the first layer to iridium oxide in the second layer of 1:1 had a normalized life of 955 kA*hr/g Ir, which is a 178% increase over a single coating of iridium oxide-tantalum oxide and a 110% increase over a single coating of iridium oxide-tin oxide coating. The two coating layer electrode in an iridium oxide-tin oxide: iridium oxide-tantalum oxide molar ratio of 2:1 had a normalized life of 664 kA*hr/g Ir, which is a 93% increase over a single coating of iridium oxide-tantalum oxide and a 46% increase over a single coating of iridium oxide-tin oxide.

The results indicate that two coating layer electrodes with molar ratio of iridium oxide in the first coating layer to iridium oxide in the second coating layer of 1:2, 1:1, and 2:1 have a higher normalized life than electrodes having single coatings of iridium oxide-tin oxide and iridium oxide-tantalum oxide. The electrodes with a molar ratio of iridium oxide in the first coating layer to iridium oxide in the second coating layer of 1:1 showed the greatest increase in normalized life over both the single coating of iridium oxide-tin oxide and iridium oxide-tantalum oxide. The two coating layer electrode may exhibit longer life, better performance, less down time for replacing electrodes, and lower costs. Through use of an electrode having two coatings, a synergistic effect resulted. It is believed that the synergistic effect may provide optimal (e.g., increased) performance of an electrode, as compared to the sum of the performance of an electrode having a first coating and the performance of an electrode having a second coating. In some embodiments, more than two coating layers may be applied to an electrode substrate.

TABLE 2

Lifetime comparison

| Coating | Normalized life, kA * hr/g Ir | % change over one coating of IOA-HF | % change over one coating of IOA-LC |
|---|---|---|---|
| iridium oxide-tantalum oxide | 343 | N/A | −24.4 |
| iridium oxide-tin oxide | 454 | 32.4 | N/A |
| Iridium oxide in first layer to iridium oxide in second layer of 1:2 | 610 | 77.8 | 34.4 |
| Iridium oxide in first layer to iridium oxide in second layer of 1:1 | 955 | 178.4 | 110.4 |
| Iridium oxide in first layer to iridium oxide in second layer of 2:1 | 664 | 93.6 | 46.3 |

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the disclosure. It is therefore to be understood that the embodiments described herein are presented by way of example only and that, within the scope of the appended claims and equivalents thereto; the invention may be practiced otherwise than as specifically described.

Moreover, it should also be appreciated that the disclosure is directed to each feature, system, subsystem, or technique described herein and any combination of two or more features, systems, subsystems, or techniques described herein, if such features, systems, subsystems, and techniques are not mutually inconsistent, is considered to be within the scope of the disclosure as embodied in the claims. Further, acts, elements, and features discussed only in combination with one embodiment are not intended to be excluded from a similar role in other embodiments.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phases "consisting of" and "consisting essentially of," are closed or semi-closed transitional phrases, respectively, with respect to the claims. Use of ordinal terms such as "first," "second," "third," and the like in the claims to modify a claim element does not itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The invention claimed is:
1. An electrode, comprising:
an electrically conductive substrate;

a first coating covering at least a portion of a surface of the electrically conductive substrate, the first coating consisting of a mixture of iridium oxide and tin oxide, having 45 wt. % to 65 wt. % iridium oxide; and a second coating covering at least a portion of the first coating, the second coating consisting of a mixture of iridium oxide and tantalum oxide.

2. The electrode of claim 1, wherein the electrically conductive substrate comprises a valve metal.

3. The electrode of claim 2, wherein the valve metal is selected from the group consisting of titanium, zirconium, niobium, and tantalum.

4. The electrode of claim 3, wherein the valve metal is titanium.

5. The electrode of claim 1, wherein the second coating comprises 40 wt. % to 75 wt. % iridium oxide.

6. The electrode of claim 5, wherein the second coating comprises 65 wt. % iridium oxide.

7. The electrode of claim 1, wherein a molar ratio of iridium oxide in the first coating to the iridium oxide in the second coating is selected from the group consisting of 1:2, 1:1, and 2:1.

8. The electrode of claim 7, wherein the molar ratio of iridium oxide in the first coating to the iridium oxide in the second coating is 1:1.

9. The electrode of claim 8, wherein the electrode provides for a 175% longer normalized life than a reference electrode comprising a single layer coating consisting of a composition of the second coating, wherein the normalized life is calculated by the following equation:

$((x-y)/y)*100$, where x is the electrode's lifetime, and y is the reference electrode's lifetime; and lifetime is measured in A*hr/g Ir and determined by applying a constant current until a rise in voltage is measured.

10. The electrode of claim 8, wherein the electrode provides for a 110% longer normalized life than a reference electrode comprising a single layer coating consisting of a composition of the first coating, wherein the normalized life is calculated by the following equation:

$((x-y)/y)*100$, where x is the electrode's lifetime, and y is the reference electrode's lifetime; and lifetime is measured in A*hr/g Ir and determined by applying a constant current until a rise in voltage is measured.

11. The electrode of claim 1, wherein the electrode is an anode.

12. A system comprising an electrolytic cell, comprising:
an electrode comprising:
an electrically conductive substrate;
a first coating covering at least a portion of a surface of the electrically conductive substrate, the first coating consisting of a mixture of iridium oxide and tin oxide, having 45 wt. % to 65 wt. % iridium oxide; and
a second coating covering at least a portion of the first coating, the second coating consisting of a mixture of iridium oxide and tantalum oxide; and
a power source for supplying a current to the electrode.

13. The system of claim 12, wherein the electrode is immersed in an electrolyte.

14. An electrode, comprising:
an electrically conductive substrate;
a first coating covering at least a portion of a surface of the electrically conductive substrate, the first coating consisting of a mixture of iridium oxide and tin oxide; and
a second coating covering at least a portion of the first coating, the second coating consisting of a mixture of iridium oxide and tantalum oxide, having 40 wt. % to 75 wt. % iridium oxide.

15. The electrode of claim 14, wherein the electrically conductive substrate comprises a valve metal.

16. The electrode of claim 15, wherein the valve metal is selected from the group consisting of titanium, zirconium, niobium, and tantalum.

17. The electrode of claim 16, wherein the valve metal is titanium.

18. The electrode of claim 14, wherein the first coating comprises 30 wt. % to 85 wt. % iridium oxide.

19. The electrode of claim 18, wherein the first coating comprises 45 wt. % to 65 wt. % iridium oxide.

20. The electrode of claim 14, wherein the second coating comprises 65 wt. % iridium oxide.

21. The electrode of claim 14, wherein a molar ratio of iridium oxide in the first coating to the iridium oxide in the second coating is selected from the group consisting of 1:2, 1:1, and 2:1.

22. The electrode of claim 14, wherein the electrode is an anode.

23. A system comprising an electrolytic cell, comprising:
an electrode comprising:
an electrically conductive substrate;
a first coating covering at least a portion of a surface of the electrically conductive substrate, the first coating consisting of a mixture of iridium oxide and tin oxide; and
a second coating covering at least a portion of the first coating, the second coating consisting of a mixture of iridium oxide and tantalum oxide, having 40 wt. % to 75 wt. % iridium oxide; and
a power source for supplying a current to the electrode.

24. The system of claim 23, wherein the electrode is immersed in an electrolyte.

* * * * *